(12) United States Patent
Gangadharan et al.

(10) Patent No.: US 8,751,725 B1
(45) Date of Patent: Jun. 10, 2014

(54) HYBRID STORAGE AGGREGATE

(75) Inventors: SushilKumar Gangadharan, Sunnyvale, CA (US); Mark Smith, Cupertino, CA (US); Ravikanth Dronamraju, Pleasanton, CA (US)

(73) Assignee: NetApp, Inc., Sunnyvale, CA (US)

( * ) Notice: Subject to any disclaimer, the term of this patent is extended or adjusted under 35 U.S.C. 154(b) by 150 days.

(21) Appl. No.: 13/359,991

(22) Filed: Jan. 27, 2012

(51) Int. Cl.
*G06F 12/00* (2006.01)
(52) U.S. Cl.
USPC ........... 711/100; 711/101; 711/118; 711/154; 711/156; 711/158
(58) Field of Classification Search
USPC .................. 711/100, 101, 118, 154, 156, 158
See application file for complete search history.

(56) References Cited

U.S. PATENT DOCUMENTS

| | | | | |
|---|---|---|---|---|
| 7,143,264 | B2 * | 11/2006 | Debes et al. | 711/217 |
| 7,631,155 | B1 * | 12/2009 | Bono et al. | 711/156 |
| 2003/0097523 | A1 * | 5/2003 | Nobuyoshi et al. | 711/112 |
| 2010/0115614 | A1 * | 5/2010 | Barile et al. | 726/22 |
| 2010/0199036 | A1 * | 8/2010 | Siewert et al. | 711/112 |
| 2010/0281230 | A1 | 11/2010 | Rabii et al. | |
| 2011/0145205 | A1 * | 6/2011 | Jain et al. | 707/687 |

* cited by examiner

*Primary Examiner* — Stephen Elmore
(74) *Attorney, Agent, or Firm* — Cooper Legal Group, LLC

(57) ABSTRACT

Among other things, one or more techniques and/or systems are provided for storing data within a hybrid storage aggregate comprising a solid state storage tier and a non-solid state storage tier. In particular, frequently accessed data and/or randomly accessed data may be identified and stored within the solid state storage tier to mitigate mechanical latency that may arise from accessing such data from the non-solid state storage tier. Infrequently accessed data and/or sequentially accessed data may be identified and stored within the non-solid state storage tier to utilize cost effective storage space while mitigating undesirable mechanical latency associated with accessing such data.

27 Claims, 11 Drawing Sheets

HYBRID STORAGE AGGREGATE

FIELD

The instant disclosure pertains to storing data within a hybrid storage aggregate comprising a solid state storage tier and a non-solid state storage tier.

BACKGROUND

A storage server may comprise a computer configured to provide storage functionality relating to organization and accessibility of data stored on storage devices, such as non-volatile storage media. The storage server may be configured to operate according to a client/server model to enable clients to access data through the storage server.

A storage server may store data on various types of non-volatile storage media, such as relatively high latency (e.g., longer access times) hard disk drives (HDDs) and relatively low latency (e.g., shorter access times) solid state devices (SSDs). Latency (e.g., access time) generally corresponds to a period of time needed to retrieve data from a storage device. HDD access time may be a function of disk spin-up time, seek time, rotational delay, and/or data transfer time. Spin-up time may be a time needed to accelerate a disk to operating speed. Seek time may be a time for an access arm of the disk to reach a desired disk track. Rotational delay may be a delay for rotation of the disk to bring a desired disk sector under a read-write mechanism, which may be dependent upon rotational speed of the disk. Data transfer time may be a time during which data is read from and/or written to the storage media.

HDDs may store data on rapidly rotating platters with magnetic surfaces (e.g., an HDD may comprise magnetic storage media). Because HDDs may access data mechanically, access times of HDDs may be relatively slow due to mechanical delays (e.g., owing to disk spin-up time, seek time, rotational delay, and/or data transfer time). SSDs may store data within solid state memory, such as non-volatile flash memory, to store persistent data (e.g., an SSD may comprise electronic storage media). Because SSDs may access data with little to no mechanical movement, access times of SSDs may be relatively fast (e.g., low latency). Unfortunately, SSD storage media may be more expensive than HDD storage media, and may have a shorter operational lifetime due to wear and other degradation.

SUMMARY

The disclosure relates to at least one or more techniques and/or systems that store data within a hybrid storage aggregate comprising a solid state storage tier and a non-solid state storage tier. A storage server may be configured to store data within the hybrid storage aggregate, and provide a client with access to such data. The hybrid storage aggregate may comprise a hybrid of storage devices. For example, the hybrid storage aggregate may comprise a solid state storage tier (e.g., one or more electronic storage devices, such as solid state storage devices), a non-solid state storage tier (e.g., one or more magnetic storage devices, such as hard disk drives), and/or other storage tiers. As provided herein, data suitable for storage within a solid state storage tier, such as a solid state storage device, and data suitable for storage within a non-solid state storage tier, such as a non-solid state storage device may be identified. For example, frequently accessed (e.g., "hot") data and/or randomly accessed data may be identified and stored within a solid state storage device, while infrequently accessed (e.g., "cold") data and/or sequentially accessed data may be identified and stored within a non-solid state storage device.

In one example of storing data within a solid state storage device, a data I/O operation may be evaluated to determine whether the data I/O operation randomly accesses data blocks or sequentially accesses data blocks. In particular, block offsets of data blocks (e.g., locations of data blocks within a data volume) associated with the data I/O operation may be identified to determine an access pattern (e.g., an access pattern of 3, 5, 10, and 13 may be determined by identifying block offsets of 3, 5, 10, and 13 that are specified within a read data I/O operation). The access pattern may be evaluated to determine whether the I/O operation randomly accesses the data blocks or sequentially accesses the data blocks. In one example, the access pattern may comprise a sequence of block offsets. The sequence of block offsets may be traversed (e.g., evaluated) to compare values of respective block offsets with values of neighboring block offsets to determine whether such values differ greater then a threshold value. In one example, an access pattern of 3, 5, 10, 11, and 13 may be determined as non-sequentially accessing data blocks because at least one set of values of respective neighboring block offsets differ by more than 1 (e.g., 3 differs from 5 by more than 1, 5 differs from 10 by more than 1, and 11 differs from 13 by more than 1). In another example, an access pattern of 7, 8, 9, 10, and 11 may be determined as sequentially accessing data blocks because values of respective neighboring block offsets differ by 1 or less (e.g., 7 differs from 8 by 1, 8 differs from 9 by 1, 9 differs from 10 by 1, and 10 differs from 11 by 1).

If the data I/O operation sequentially accesses the data blocks, then the data blocks may be stored within the non-solid state storage device because latency associated with accessing the (sequentially accessed) data blocks stored in the non-solid state storage device may be similar to a latency of accessing the solid-state storage device. Additionally, storing the sequentially accessed data blocks within the non-solid state storage device may be cost effective because of the inexpensive storage cost of the non-solid state storage device with respect to the solid state storage device.

If the data I/O operation randomly accesses the data blocks, then the data blocks may be stored within the solid state storage device, which may improve access time to the data blocks. In one example, if the data I/O operation is identified as a random read data I/O operation, then the data blocks may be retrieved from the non-solid state storage device (e.g., the data blocks may already be stored within the non-solid state storage device, but it may be advantageous to store (e.g., cache) such data blocks within the solid state storage device to mitigate mechanical latency arising from randomly accessing the data blocks from the non-solid state storage device). Once read from the non-solid state storage device, the data blocks may be stored within a cache buffer. The random read data I/O operation may be satisfied using the data blocks stored within the cache buffer. The data blocks may be stored (e.g., cached) from the cache buffer into the solid state storage device. As such, future random data I/O operations for the (randomly accessed) data blocks may be satisfied using the data blocks stored within the solid state storage device, which may result in improved access times over retrieving the data blocks from the non-solid state storage device. In another example, if the data I/O operation is identified as a random write data I/O operation, then the data blocks may be stored (e.g., cached) within the solid state storage device (e.g., the data blocks may be merely cached within the solid state storage device, and may not be written to the non-solid state storage device until eviction).

Identifying and storing randomly accessed data blocks within the solid state storage device may reduce latency that may otherwise affect a client accessing such randomly accessed data blocks stored in a non-solid state storage device (e.g., mechanical latency may affect performance of the non-solid state storage device with respect to randomly accessed data blocks due to mechanical latency arising from the amount of mechanical movements needed to access data blocks stored at non-sequential locations). Identifying and storing sequentially accessed data blocks within the non-solid state storage device may be cost effective (e.g., non-solid state storage devices may be less expensive than solid state storage devices) and may not increase access times for a client (e.g., non-solid state storage devices may sequentially access data at a similar rate as solid state storage devices).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
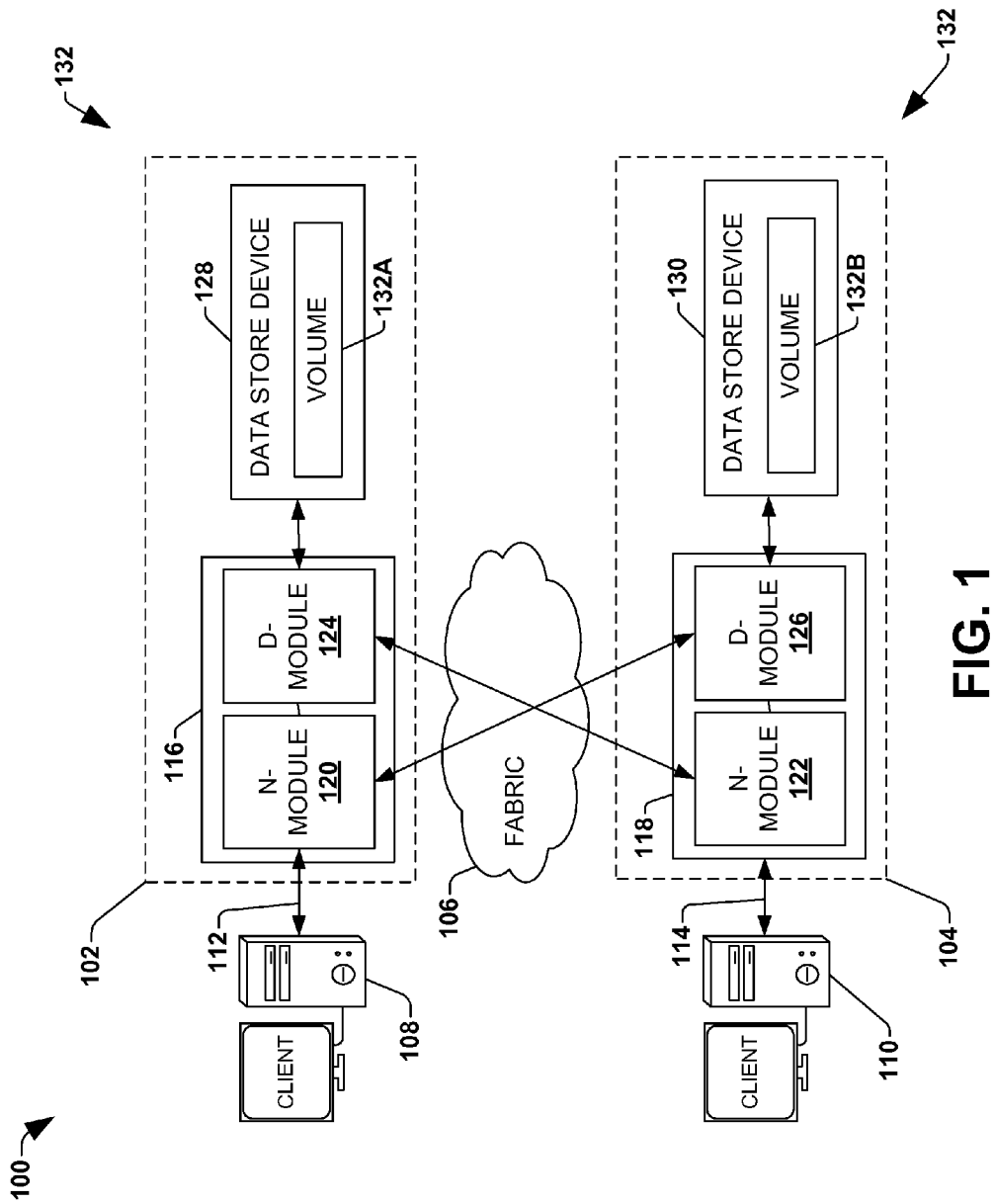
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

A storage server (e.g., a node of a data storage system within a clustered network environment) may be configured to provide data storage and management services. The storage server may provide clients with access to data stored with storage devices. In particular, the storage server may store data within a hybrid storage aggregate. The hybrid storage aggregate may comprise a logical aggregation of physic storage (e.g., a logical container for a pool of storage combining one or more physical storage devices or parts thereof into a single logical storage container), which may provide storage for one or more logical datasets at a higher level of abstraction, such as volumes. Because the hybrid storage aggregate may be configured as a single logical storage container, a file system (e.g., or other type of arrangement) may be implemented within the hybrid storage aggregate. The file system may comprise a structured set of stored files, directories, and/or other data containers (e.g., the storage server may store user data within the file system).

The hybrid storage aggregate may comprise multiple tiers of storage devices. For example, the hybrid storage aggregate may comprise a solid state storage tier of relatively lower latency storage devices (e.g., one or more solid state storage devices, such as a flash storage device), a non-solid state storage tier of relatively higher latency storage devices (e.g., one or more non-solid state storage devices, such as a hard disk drive), and/or other storage tiers. The lower latency solid state storage tier may be utilized to store data that is frequently accessed and/or randomly accessed from the hybrid storage aggregate. The higher latency non-solid state storage tier may be utilized to store data that is infrequently accessed and/or sequentially accessed from the hybrid storage aggregate.

Accordingly, one or more techniques and/or systems for storing data within a hybrid storage aggregate comprising a solid state storage tier and a non-solid state storage tier are provided herein. In particular, randomly accessed data may be identified and stored within a solid state storage device of the hybrid storage aggregate to reduce latency, while sequentially accessed data may be identified and stored within a non-solid state storage device of the hybrid storage aggregate to reduce storage costs while mitigating negative impact on latency.

Figure 2:
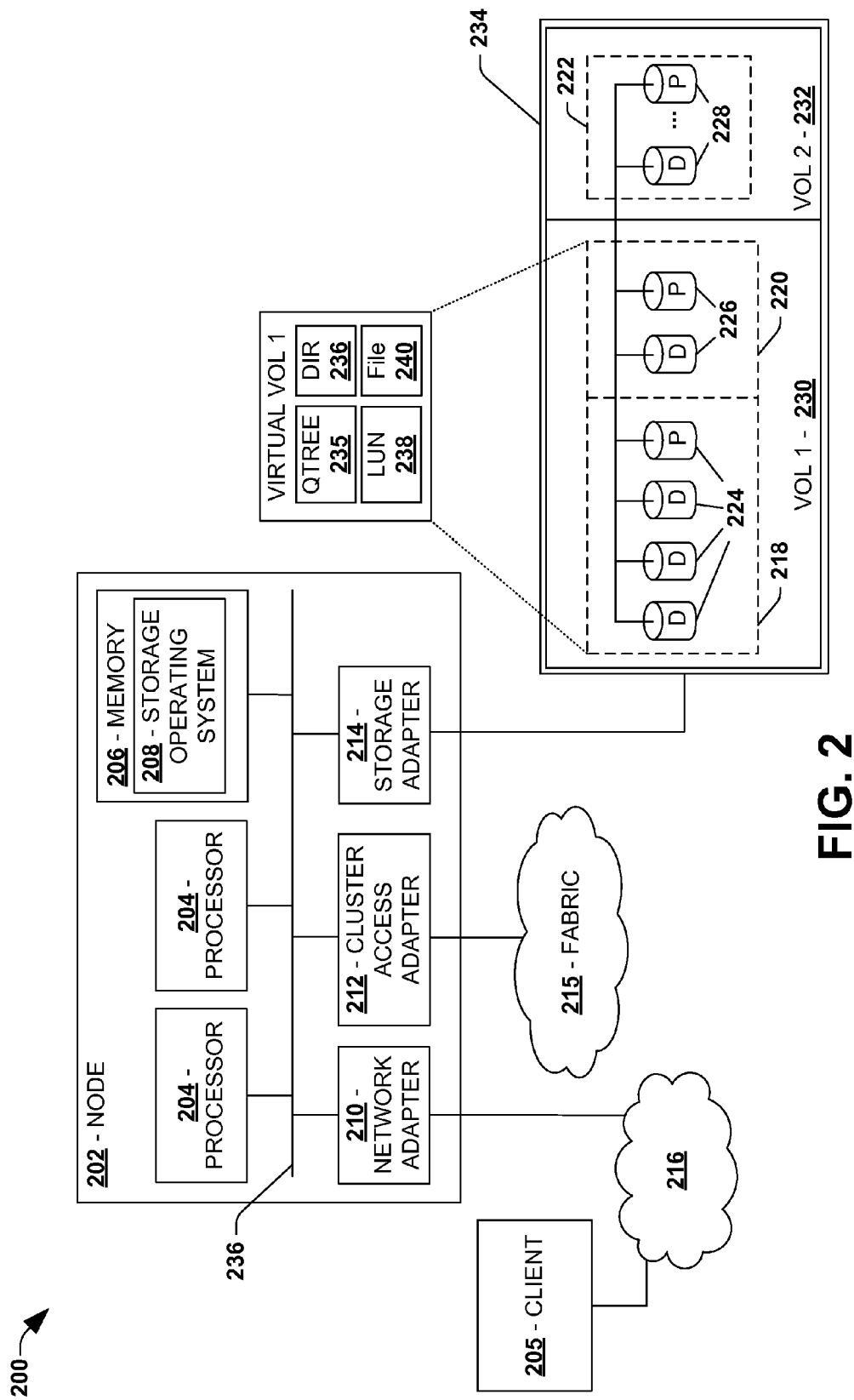
FIG. 2 is a component block diagram illustrating an example data storage system in accordance with one or more of the provisions set forth herein.

To provide context for storing data within a hybrid storage aggregate, FIG. 1 illustrates a clustered network environment 100 (e.g., a network storage environment), and FIG. 2 illustrates an embodiment of a data storage system 200 (e.g., comprising a storage server) that may be implemented as a hybrid storage aggregate. For example, the hybrid storage aggregate may comprise data storage devices 128, 130, data storage device 234, and/or other data storage devices not illustrated. Nodes 118, 120 and/or node 202 may be implemented as storage servers configured to store data and/or provide clients 108, 110 and/or client 205 with access to data stored within the hybrid storage aggregate. For example, nodes 118, 120 and/or node 202 may comprise components configured to store data within the hybrid storage aggregate, such as an offset evaluation component, a data storage component, a write caching component, a read caching component, a metadata caching component, a cache buffer component, and/or an eviction component. It may be appreciated, however, that the techniques, etc. described herein may be implemented within the clustered network environment 100, a non-cluster network environment, and/or a variety of other computing environments to mitigate network usages. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

It may be appreciated that a hybrid storage aggregate may be implemented within clustered network environment 100. For example, the hybrid storage aggregate may comprise storage device 128, 130 and/or other storage devices not illustrated. Nodes 116, 118 may be implemented as storage servers configured to store data and/or provide clients 108, 110 with access to data stored within the hybrid storage aggregate. For example, nodes 116 and 118 may comprise components configured to store data within the hybrid storage aggregate, such as an offset evaluation component, a data storage component, a write caching component, a read caching component, a metadata caching component, a cache buffer component, and/or an eviction component.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files and/or other data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 236. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the host 202 can to respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can includes input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 236 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, such as data (D) and/or parity (P), whereas the directory may be implemented as a specially formatted file in which other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical memory whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical memory locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the host 202 connects to a volume 230, 232 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that a hybrid storage aggregate may be implemented in data storage system 200. For example, the hybrid storage aggregate may comprise storage device 234 (e.g., disks 224, 226, and/or 228) and/or other storage devices not illustrated. Node 202 may be implemented as a storage server configured to store data and/or provide client 205 with access to data stored within the hybrid storage aggregate. For example, node 202 may comprise components configured to store data within the hybrid storage aggregate, such as an offset evaluation component, a data storage component, a write caching component, a read caching component, a metadata caching component, a cache buffer component, and/or an eviction component.

Figure 3:
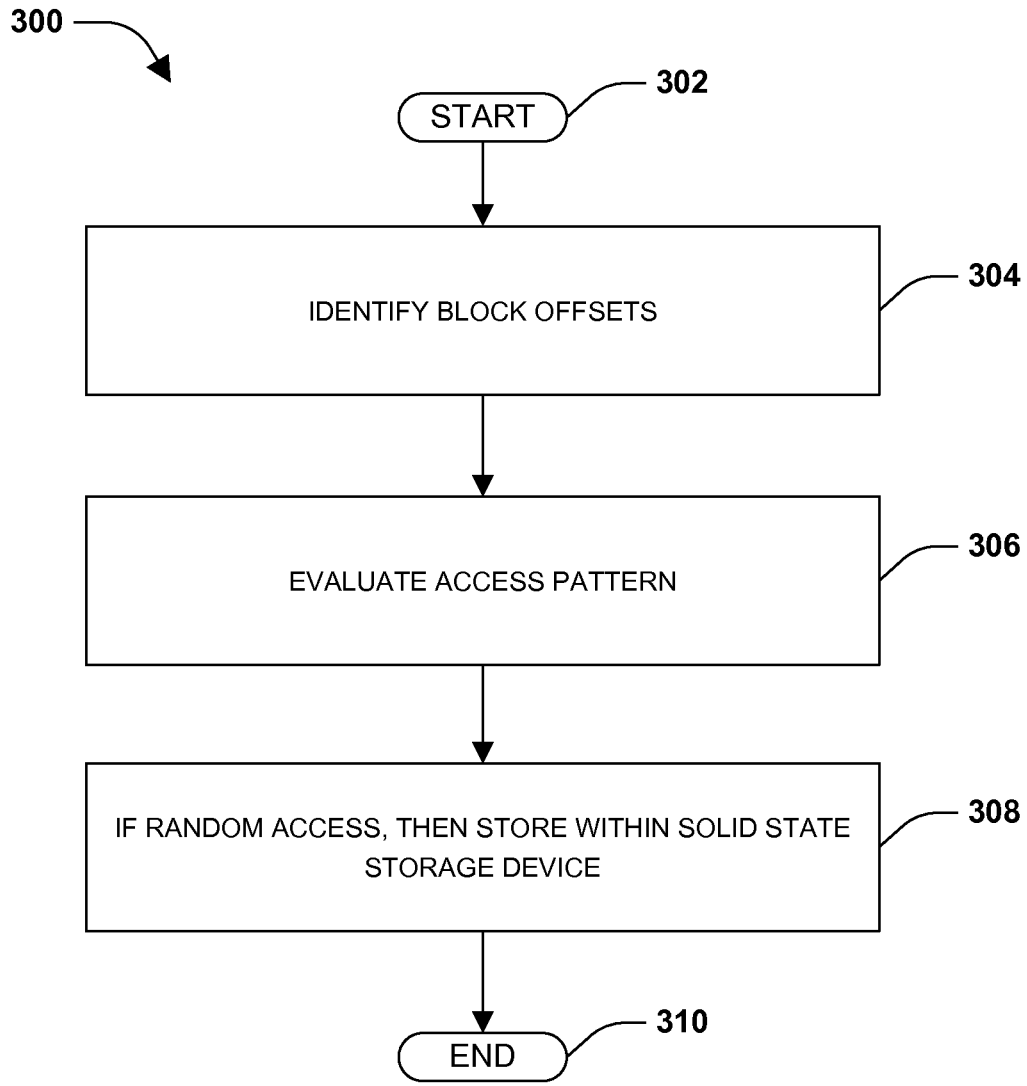
FIG. 3 is a flow chart illustrating an exemplary method of identifying randomly accessed data to store in a solid state storage device of a hybrid storage aggregate.

One embodiment of identifying randomly accessed data to store in a solid state storage device of a hybrid storage aggregate is illustrated by exemplary method 300 in FIG. 3. At 302, the method starts. The hybrid storage aggregate may comprise a solid state storage device (e.g., a relatively low latency electronic storage device, such as an SSD flash drive, within a solid state storage tier) and a non-solid state storage device (e.g., a relatively high latency magnetic storage device, such as a hard disk drive, within a non-solid state storage tier). Data I/O operations (e.g., a read data I/O operation and/or a write data I/O operation received from a client device) may be processed by a storage server coupled to the hybrid storage aggregate. In this way, the storage server may store data within the solid state storage device, the non-solid state storage device, and/or both devices depending upon the nature of a data I/O operation. For example, frequently accessed and/or randomly accessed data of a data I/O operation may be stored within the solid state storage device (e.g., storing such data within the solid state storage device may decrease latency and improve performance), while infrequently accessed and/or sequentially accessed data of a data I/O operation may be stored within the non-solid state storage device (e.g., storing such data within the non-solid state storage device may be cost effective while mitigating negative impact on latency).

At 304, block offsets of data blocks associated with a data I/O operation may be identified to determine an access pattern. The data I/O operation may comprise a read or write instruction that specifies block offsets (e.g., locations) at which the data blocks are to be read from or written to. The block offsets may be read from the data I/O operation, and may be used to construct the access pattern. The access pattern may comprise a sequence of block offsets associated with data blocks that are to be accessed by the data I/O operation during execution of the data I/O operation.

Figure 5A:
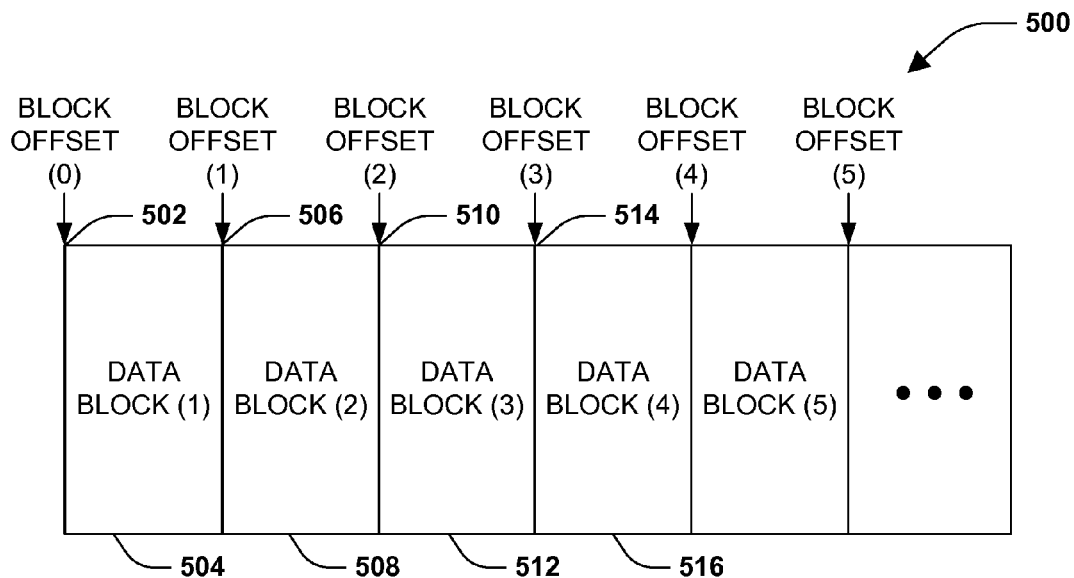
FIG. 5A is an illustration of an example of data blocks stored at block offsets.
Figure 5B:
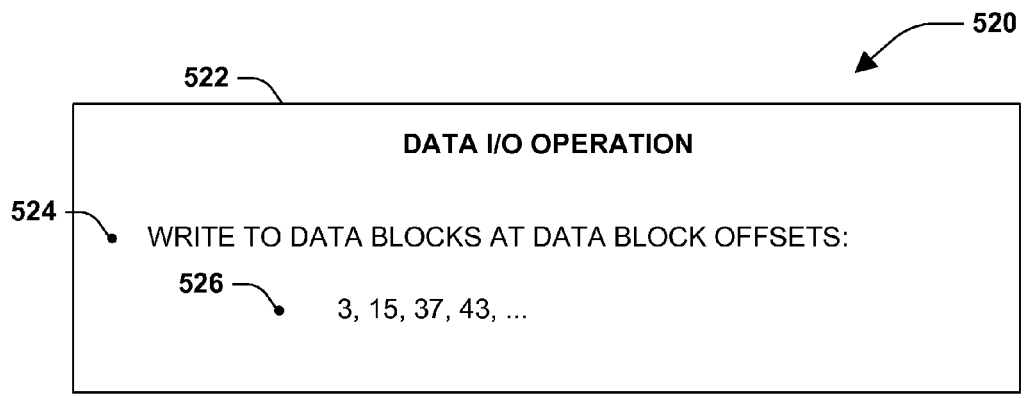
FIG. 5B is an illustration of an example of identifying a data I/O operation as a random write data I/O operation.
Figure 5C:
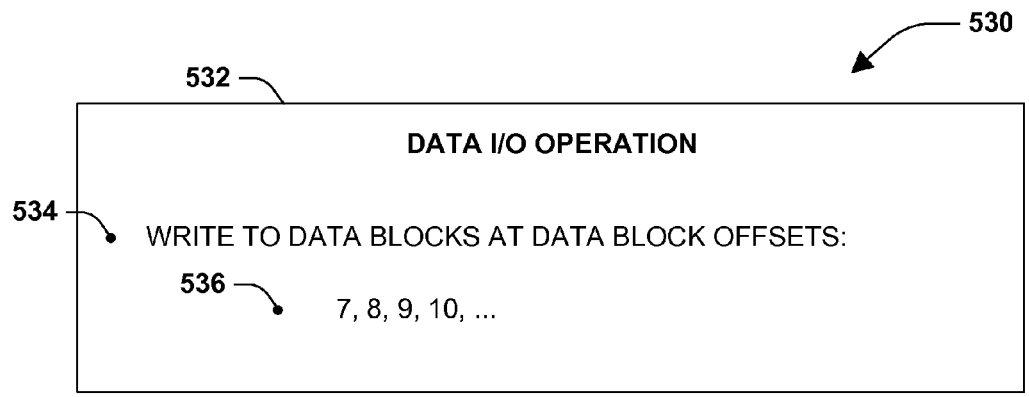
FIG. 5C is an illustration of an example of identifying a data I/O operation as a sequential write data I/O operation.

At 306, the access pattern may be evaluated to determine whether the data I/O operation randomly accesses the data blocks (e.g., random access pattern 526 of FIG. 5B) or sequentially accesses the data blocks (e.g., sequential access pattern 536 of FIG. 5C). The sequence of block offsets may be traversed (e.g., evaluated) to compare values of respective block offsets with values of neighboring block offsets within the sequence of block offsets. During traversal, a determination may be made as to whether a value of a block offset differs from a value of a neighboring block offset greater than a threshold value.

In one example, an access pattern may comprise a sequence of block offsets 3, 15, 39, and 43, and a threshold value may be set at 1. The values of block offsets may be compared with values of neighboring block offsets (e.g., a value of 3 differs from a neighboring value of 15 by greater than 1; a value of 15 differs from a neighboring value of 39 by greater than 1; and a value of 39 differs from a neighboring value of 43 by greater than 1) to determine if at least one set of values of neighboring block offsets vary greater than the threshold value of 1 (e.g., the access pattern may be determined as random because 3 and 15, 15 and 39, and/or 39 and 43 vary by greater than 1).

In another example, an access pattern may comprise a sequence of block offsets 7, 8, 9, and 10, and a threshold value may be set at 1. The values of block offsets may be compared with values of neighboring block offsets (e.g., a value of 7 differs from a neighboring value of 8 by 1; a value 8 differs from a neighboring value of 9 by 1; and a value of 9 differs from a neighboring value of 10 by 1) to determine if values neighboring block offsets vary greater than the threshold value of 1 (e.g., the access pattern may be determined as sequential because no neighboring values vary by greater than 1).

If the data I/O operation sequentially accesses the data blocks, then the data blocks may be stored within the non-solid state storage device (e.g., the non-solid state storage device may provide similar access times as the solid state storage device with respect to sequentially accessed data, and may provide cost effective storage). At 308, if the data I/O operation randomly accesses the data blocks (e.g., responsive to the access pattern indicating that the data I/O operation randomly accesses the data blocks), then the data blocks may be stored within the solid state storage device (e.g., if the solid state storage device is configured as a cache, then the data blocks may be cached within the solid state storage device). In one example, upon identifying the data I/O operation as a random read data I/O operation, the data blocks may be retrieved from the non-solid state storage device (e.g., if such data blocks are stored within the non-solid state storage device and are not already stored within the solid state storage device). The data blocks may be stored within a cache buffer, and the random read data I/O operation may be satisfied with the data blocks stored within the cache buffer. The data blocks stored within the cache buffer may be stored (e.g., cached) within the solid state storage device (e.g., persistently stored within the solid state storage device to free up space within the cache buffer and/or create a persistent copy of the data blocks). In this way, other data I/O operations for the data blocks may be satisfied from the data blocks stored within the solid state storage device, which may provide improved access time compared to the non-solid state storage device. Additional data associated with the data blocks (e.g., the next occurring N number of data blocks occurring after the sequence of block offsets) may be retrieved and/or stored (e.g., pre-fetched) within the solid state storage device.

In another example, upon identifying the data I/O operation as a random write data I/O operation, the data blocks may be cached within the solid state storage device (e.g., the data blocks may be merely stored within the solid state storage device, and not within the non-solid state storage device, to reduce the amount of access to the non-solid state storage device). In another example, upon identifying the data I/O operation as comprising a write data I/O operation, then the data blocks may be stored within the non-solid state storage device. The data blocks may be marked with a read-after-write caching indicator specifying that the data blocks are to be cached within the solid state storage device after being written to the non-solid state storage device.

It may be advantageous to store frequently accessed (e.g., "hot") data within the solid state storage device (e.g., due to relatively low latency times), and store infrequently accessed (e.g., "cold") data within the non-solid state storage device (e.g., due to relatively cheaper storage costs). In one example, frequently accessed data blocks associated with a data I/O operation may be stored within the solid state storage device, while infrequently accessed data blocks associated with a data I/O operation may be stored within the non-solid state storage device. In another example, data blocks associated with a random data I/O operation may be stored within the non-solid state storage device (e.g., as opposed to the solid state storage device due to the random access) based upon determining that the data blocks may be infrequently accessed, which may be advantageous due to the cost of storing data blocks within the solid state storage device (e.g., the storage of randomly accessed data within the solid state storage device may be tempered based upon frequency of access, and such tempering is applicable to any and/or all examples, embodiments, etc. provided herein/throughout). In one example, a time span since a data block stored within the solid state storage device was last accessed may be determined (e.g., access timers may be maintained by a storage server for data stored and/or cached within the solid state storage device). If the time span is greater than a threshold time, then the data block may be migrated from the solid state storage device to the non-solid state storage device because the data block may be deemed "cold" due to infrequent access. In one example, if the data block was merely written to the solid state storage device based upon an initial random write data I/O operation, then the data block may be relocated from the solid state storage device to the non-solid state storage device. In another example, the if the data block was cached within the solid state storage device based upon a random read data I/O operation targeting the non-solid state storage device, then the data block may be merely removed from the solid state storage device because an existing copy of the data block may exist within the non-solid state storage device. At 310, the method ends.

In one example of storing data within the hybrid storage aggregate, various storage policies may be implemented. The storage policies may specify criteria for determining whether to store data within an in-core cache buffer, a solid state storage device, and/or a non-solid state storage device. The non-solid state storage device, such as a hard disk drive, may be configured to persistently store data (e.g., long term storage of infrequently accessed data and/or sequentially accessed data). The in-core cache buffer may be implemented as a cache for the hybrid storage aggregate. Frequently accessed cached data may be stored in higher tiers of the cache buffer, while infrequently accessed data may be stored in lower tiers of the cache buffer (e.g., cached data within a lowest tier may be candidates for being scavenged, such as being removed from the cache buffer to free up space for new data to be cached). To provide a middle storage tier between the non-solid state storage device and the in-core cache buffer, the solid state storage device may be used to cache frequently accessed and/or randomly accessed data. Accordingly, various storage policies may be implemented to determine whether data is to be stored within the in-core cache buffer, the solid state storage device, and/or the non-solid state storage device.

In one example of a policy, system metafiles and/or directories cached within the in-core cache buffer may be marked to be written into the solid state storage device, and may be removed from the in-core buffer cache. In one example, the system metafiles and/or directories may be queued until a consistency point is reached. Once the consistency point is reach, the system metafiles and/or directories may be removed from the in-core buffer cache, and may be written into the solid state storage device.

In one example of a policy, a data I/O operation for data may be received. If the data is not stored within the in-core buffer cache, then the data may be retrieved from the non-solid state storage device (e.g., based upon non-solid state disk block data specified by the data I/O operation) or the solid state storage device (e.g., based upon a mapping of the non-solid state block data to solid state block data within a cache map). The retrieved data may be cached within the in-core buffer cache. If the data was randomly read from the non-solid state storage tier, then the data may be cached within the solid state storage tier.

In one example of a policy, a data I/O operation for data may be received. If the data is stored within the in-core buffer cache, then the data may be marked to be written into the solid state storage device. In one example, the data may be queued until a consistency point is reached. Once the consistency point is reach, the data may be written into the solid state storage device.

In one example of a policy (e.g., a read-after-write policy), a data I/O operation for data may be received. If the data I/O operation comprises a random write data I/O operation of writeable data (e.g., an access pattern of 1, 10, 20, 30, and 40 may indicate that the data is to be written randomly), then the in-core cache buffer may be queried to determine whether data associated with the writeable data is cached within the in-core cache buffer. If the data is cached within the in-core cache buffer, then the writeable data may be written to the in-core cache buffer until a consistency point is reached. In one example, if the data is not cached within the in-core cache buffer, then the data may be read from a storage device. The writeable data may be written to the data to create written data, and then stored within the non-solid state storage tier. If the written data is randomly stored within the non-solid state storage tier, then the written data may be marked as read-after-write, which may specify that the written data is to be stored within the solid state storage device upon a read data I/O operation of the written data. In another example, if the data is not cached within the in-core cache buffer, then the data may be read from a storage device. The writeable data may be written to the data to create written data, and then stored within the solid state storage tier.

It may be appreciated that various policies may be defined (e.g., user defined, by an administrator, etc.) for determining whether to store data blocks of a data I/O operation within the solid state storage device or the non-solid state storage, and that merely a few examples have been described, and the instant application, including the scope of the appended claims is not to be limited by the examples provided.

In one example of accessing data stored within the hybrid storage aggregate based upon the various storage policies, a user request for data may be received. The in-core buffer cache may be searched for the data. If the data is located within the in-core buffer cache, then the user request may be satisfied from the data stored within the in-core buffer cache. If the data is not located within the in-core buffer cache, then the solid state storage device may be searched for the data (e.g., non-solid state block data specified within the user request may be translated into solid state block data based upon mappings within a cache map). If the data is located within the solid state storage device, then the user request may be satisfied from the data stored within the solid state storage device. If the data is not located within the solid state storage device, then the non-solid state storage device may be searched for the data. If the data is located within the non-solid state storage device, then the user request may be satisfied from the data stored within the non-solid state storage device.

Figure 4:
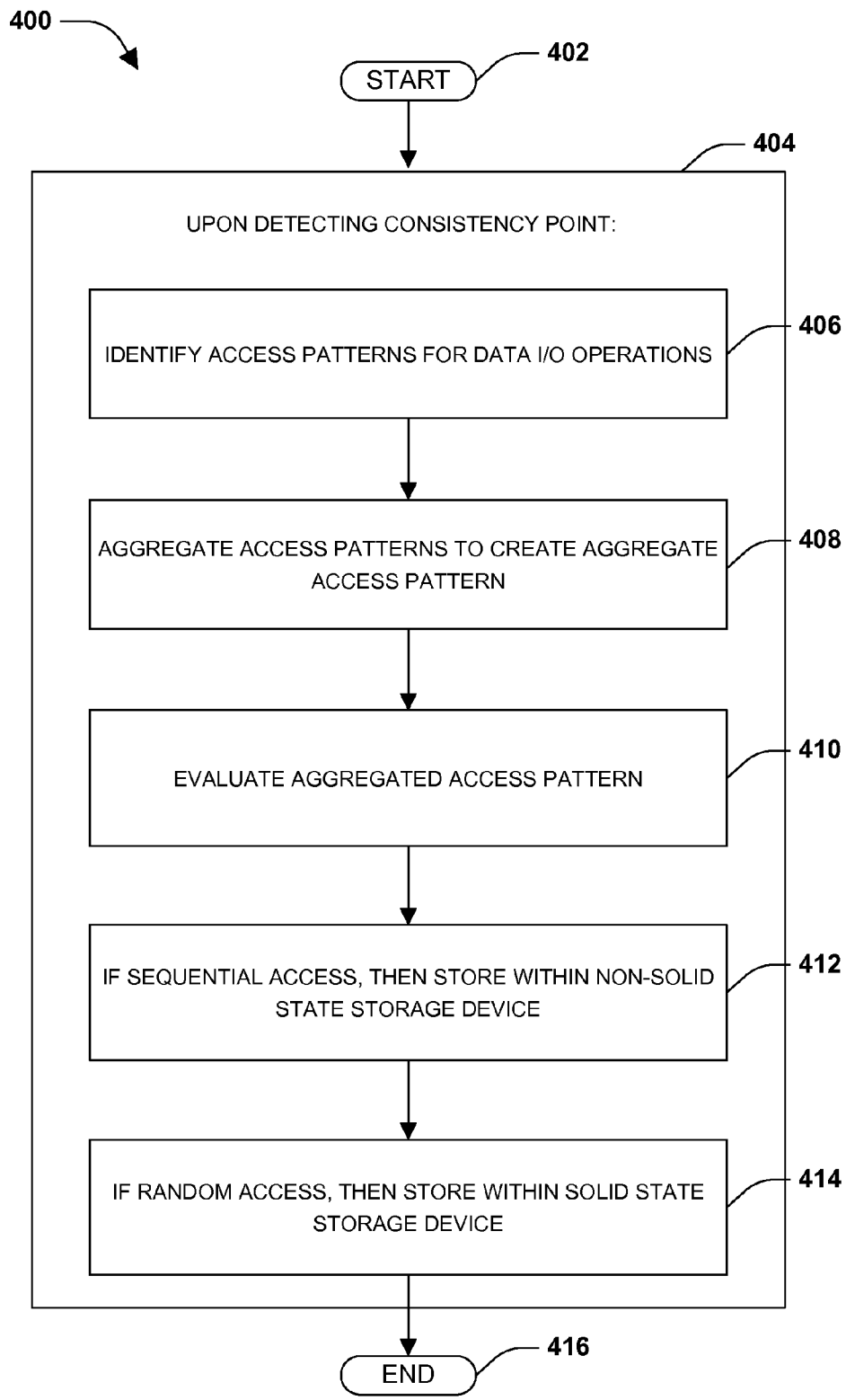
FIG. 4 is a flow chart illustrating an exemplary method of identifying randomly accessed data to store in a solid state storage device of a hybrid storage aggregate.

One embodiment of identifying randomly accessed data to store in a solid state storage device of a hybrid storage aggregate is illustrated by exemplary method 400 in FIG. 4. At 402, the method starts. In one example, a storage environment may comprise one or more storage servers configured to store data and provide clients with access to data stored within storage devices of a hybrid storage aggregate. Because a storage server may service a large number of clients, such as thousands of client machines, data I/O operations, such as write data I/O operations, from such clients may be queued over time within an operation queue (e.g., data I/O operations may be processed as a batch, as opposed to the storage server continuously processing the data I/O operations against storage devices). Accordingly, once a consistency point is reached (e.g., the operation queue comprises a number of queued data I/O operations, a timer elapses, etc.), the data I/O operations may be dequeued and processed by the storage server.

In one example, at 404, upon detecting an occurrence of a consistency point, access patterns may be identified for respective data I/O operations queued for processing, at 406. An access pattern may comprise one or more block offsets with which a data I/O operation is to access (e.g., a write data I/O operation may write data to a data block at block offset of 5). At 408, the access patterns may be aggregated to create an aggregated access pattern. In one example, a first access pattern of 5, a second access pattern of 9 and 12, and a third access pattern of 15 may be aggregated to create an aggregated access pattern of 5, 9, 12, and 15. In another example, a first access pattern of 15, a second access pattern of 18, and a third access pattern of 16 and 17 may be aggregated to create an aggregated access pattern of 15, 16, 17, and 18. At 410, the aggregated access pattern may be evaluated to determine whether the aggregated access pattern comprises a sequential access pattern (e.g., 15, 16, 17, and 18) or a random access pattern (e.g., 5, 9, 12, and 15). At 412, if the sequential access pattern is determined (e.g., responsive to the access pattern indicating that the data I/O operation sequentially accesses the data blocks), then data blocks associated with the sequential access pattern may be stored within a non-solid state storage device. At 414, if the random access pattern is determined (e.g., responsive to the access pattern indicating that the data I/O operation randomly accesses the data blocks), then data blocks associated with the random access pattern may be stored within a solid state storage device. At 416, the method ends.

FIG. 5A illustrates an example 500 of data blocks stored at block offsets. A storage device may store data within data blocks (e.g., 4 k byte blocks). For example, a 10 k file may be stored within a first 4 k data block, a second 4 k data block, and a third 4 k data block (e.g., the first 4 k of the file may be stored within the first data block, the second 4 k of the file may be stored within the second data block, and the remaining 2 k of the file may be stored within the third data block). The data blocks may be stored at block offsets (e.g., starting locations of the data blocks within a volume of the storage device). In one example, a storage device may comprise a data block (1) 504 starting at block offset (0) 502, a data block (2) 508 starting at block offset (1) 506, a data block (3) 512 starting at block offset (2) 510, a data block (4) 516 starting at block offset (3) 514, and/or other data blocks starting at other block offsets.

Data stored within the storage device may be randomly accessed or sequentially accessed. Accessing data randomly within a non-solid state storage device, such as a hard disk drive, may result in numerous mechanical movements that may lead to a relatively higher latency (e.g., access times that may be longer than that of a solid state storage device) due to mechanical delay. Accessing data sequentially within the non-solid state storage device may not result in numerous mechanical movements, and thus the latency may not be as high (e.g., sequentially accessing data within the non-solid state storage device may result in desirable access times similar to that of a solid state storage device). Accordingly, it may be advantageous to identify and store randomly accessed data within a solid state storage device to reduce latency that may otherwise occur from storing the randomly accessed data within a non-solid state storage device. Similarly, it may be advantageous to identify and store sequentially accessed data within a non-solid state storage device to reduce increased storage cost associated with the solid state storage device.

FIG. 5B illustrates an example 520 of identifying a data I/O operation 522 as a random write data I/O operation. The data I/O operation 522 may be received by a storage server from a client device. The data I/O operation 522 may specify 524 that data is to be written to data blocks at block offsets (3, 5, 37, and 43) 526. The block offsets (3, 5, 37, and 43) 526 may be used to determine an access pattern (3, 5, 37, and 43). The access pattern (3, 5, 37, and 43) may be evaluated to determine whether the data I/O operation 522 accesses the data blocks randomly or sequentially. In one example, the data I/O operation 522 may be determined as randomly accessing the data blocks based upon values of block offsets within the access pattern differing from values of neighboring block offsets by greater than 1 (e.g., 3 differs from 5 by more than 1, 5 differs from 37 by more than 1, and 37 differs from 43 by more than 1). Accordingly, the data I/O operation 522 may be identified as a random write data I/O operation. In this way, the data blocks may be written to a solid state storage device to reduce mechanical delay that may otherwise result from accessing the data blocks from a non-solid state storage device.

FIG. 5C illustrates an example 530 of identifying a data I/O operation 532 as a sequential write data I/O operation. The data I/O operation 532 may be received by a storage server from a client device. The data I/O operation 532 may specify 534 that data is to be written to data blocks at block offsets (7, 8, 9, and 10) 536. The block offsets (7, 8, 9, and 10) 536 may be used to determine an access pattern (7, 8, 9, and 10). The access pattern (7, 8, 9, and 10) may be evaluated to determine whether the data I/O operation 532 accesses the data blocks randomly or sequentially. In one example, the data I/O operation 532 may be determined as sequentially accessing the data blocks based upon values of block offsets within the access pattern differing from values of neighboring block offsets by no more than 1 (e.g., 7 differs from 8 by no more than 1, 8 differs from 9 by no more than 1, and 9 differs from 10 by no more than 1). Accordingly, the data I/O operation 532 may be identified as a sequential write data I/O operation. In this way, the data blocks may be written to a non-solid state storage device to reduce storage costs and maintain desirable access times when sequentially accessing the data blocks.

Figure 6:
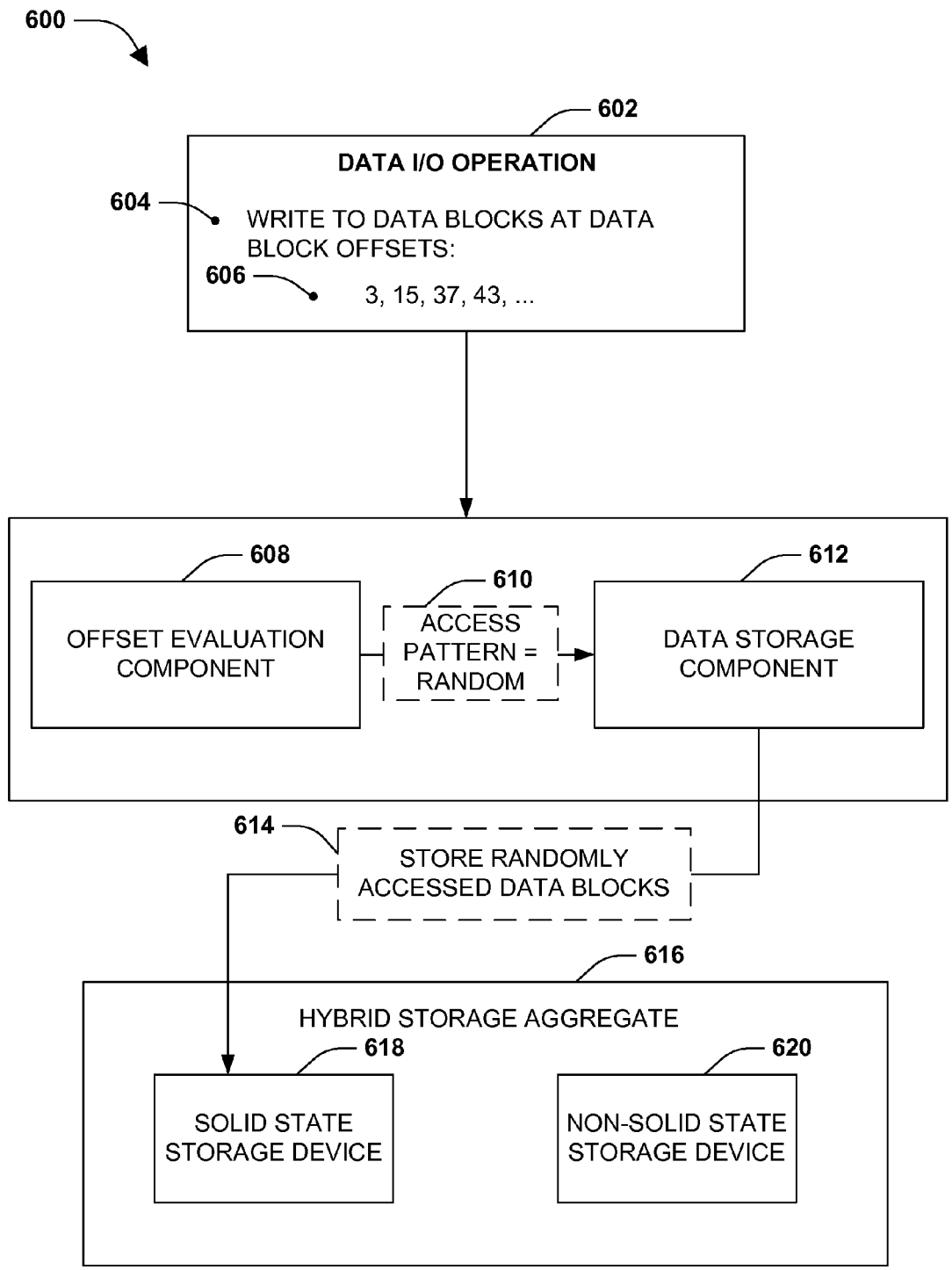
FIG. 6 is a component block diagram illustrating an exemplary system for identifying randomly accessed data to store in a solid state storage device of a hybrid storage aggregate.

FIG. 6 illustrates an example of a system 600 configured for identifying randomly accessed data to store in a solid state storage device 618 of a hybrid storage aggregate 616. The system 600 may comprise an offset evaluation component 608 and/or a data storage component 612. It may be appreciated that in one example, the offset evaluation component 608 and/or the data storage component 612 may be implemented within a storage server (e.g., nodes 118, 120, and 202 of FIGS. 1 and 2) configured to store data and/or provide clients with access to data stored within the hybrid storage aggregate 616 (e.g., a logical grouping of one or more solid state storage devices and one or more non-solid state storage devices). The offset evaluation component 608 may be configured to determine whether a data I/O operation 602 randomly or sequentially accesses data associated with the hybrid storage aggregate 616. In one example, the data I/O operation 602 may specify 604 that data is to be written to data blocks at block offsets (3, 15, 37, and 43) 606. The offset evaluation component 608 may determine an access pattern (3, 15, 37, and 43) based upon the block offsets (3, 15, 37, and 43) 606 specified within the data I/O operation 602. The offset evaluation component 608 may evaluate the access pattern (3, 15, 37, and 43) to determine whether the data I/O operation 602 accesses the data blocks randomly or sequentially. In one example, the offset evaluation component 608 may determine that the data I/O operation 602 accesses the data blocks randomly (e.g., a random access pattern 610 may be determined by traversing (e.g., evaluating) the access pattern (3, 15, 37, and 43) to determine that at least one set of values of neighboring block offsets differ by greater than 1, such as 15 differing from 37 by greater than 1).

The data storage component 612 may be configured to store 614 the data blocks within a solid state storage device 618 of the hybrid storage aggregate 616. In one example, the data storage component 612 may cache the data blocks within the solid state storage device 618 (e.g., the solid state storage device 618 may be configured as a cache). In this way, the data blocks may be retrieved from the solid state storage device 618 with relatively low latency. If additional data blocks associated with the data blocks are identifiable, then the additional data may be pre-fetched and stored within the solid state storage device 618.

It may be advantageous to store frequently accessed (e.g., "hot") data within the solid state storage device 618, but store infrequently accessed (e.g., "cold") data within a non-solid state storage device 620. Accordingly, if a data block stored within the solid state storage device 618 become "cold", then the data storage component 612 may migrate the data block from the solid state storage device 618 to the non-solid state storage device 620 to decrease storage costs because the non-solid state storage device 620 may have a relatively lower storage cost than the solid state storage device 618.

Figure 7:
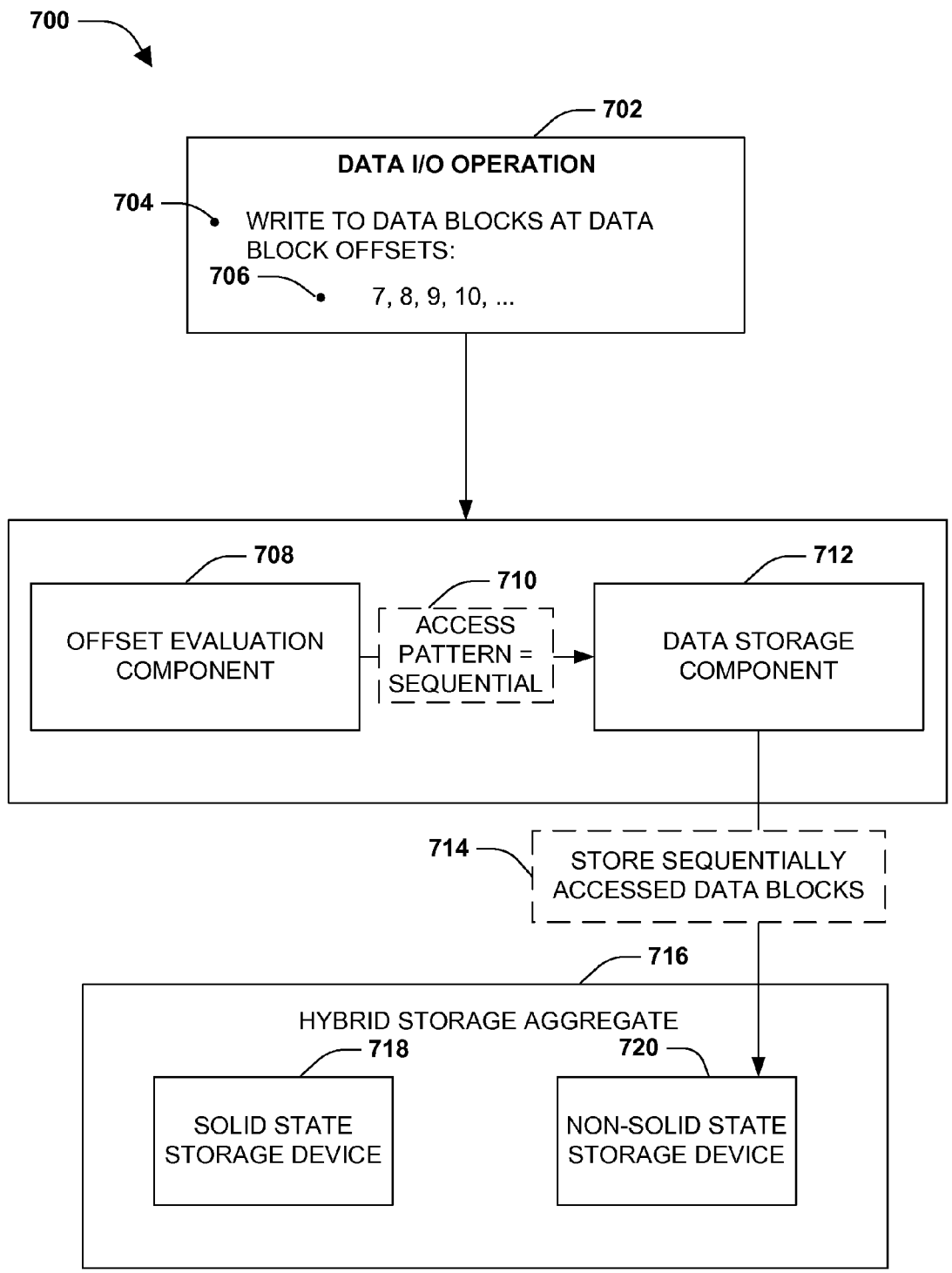
FIG. 7 is a component block diagram illustrating an exemplary system for identifying randomly accessed data to store in a solid state storage device of a hybrid storage aggregate.

FIG. 7 illustrates an example of a system 700 configured for identifying randomly accessed data to store in a solid state storage device 718 of a hybrid storage aggregate 716. The system 700 may comprise an offset evaluation component 708 and/or a data storage component 712. It may be appreciated that in one example, the offset evaluation component 708 and/or the data storage component 712 may be implemented within a storage server (e.g., nodes 118, 120, and 202 of FIGS. 1 and 2) configured to store data and/or provide clients with access to data stored within the hybrid storage aggregate 716. The offset evaluation component 708 may be configured to determine whether a data I/O operation 702 randomly or sequentially accesses data associated with the hybrid storage aggregate 716.

In one example, a data I/O operation 702 may specify 704 that data is to be written to data blocks at block offsets (7, 8, 9, and 10) 706. The offset evaluation component 708 may determine an access pattern (7, 8, 9, and 10) based upon the block offsets (7, 8, 9, and 10) 706 specified within the data I/O operation 702. The offset evaluation component 708 may evaluate the access pattern (7, 8, 9, and 10) to determine whether the data I/O operation 702 accesses the data blocks randomly or sequentially. The offset evaluation component 708 may determine that the data I/O operation accesses the data blocks sequentially (e.g., a sequential access pattern 710 may be determined by traversing (e.g., evaluating) the access pattern to determine that values of block offsets do not differ from values of neighboring block offsets by more than 1, such as 8 differing from 9 by no more than 1). The data storage component 712 may be configured to store 714 the data blocks within the non-solid state storage device 720 of the hybrid storage aggregate 716 because the non-solid state storage device 720 may provide low cost storage and desirable access times for sequentially accessed data.

Figure 8:
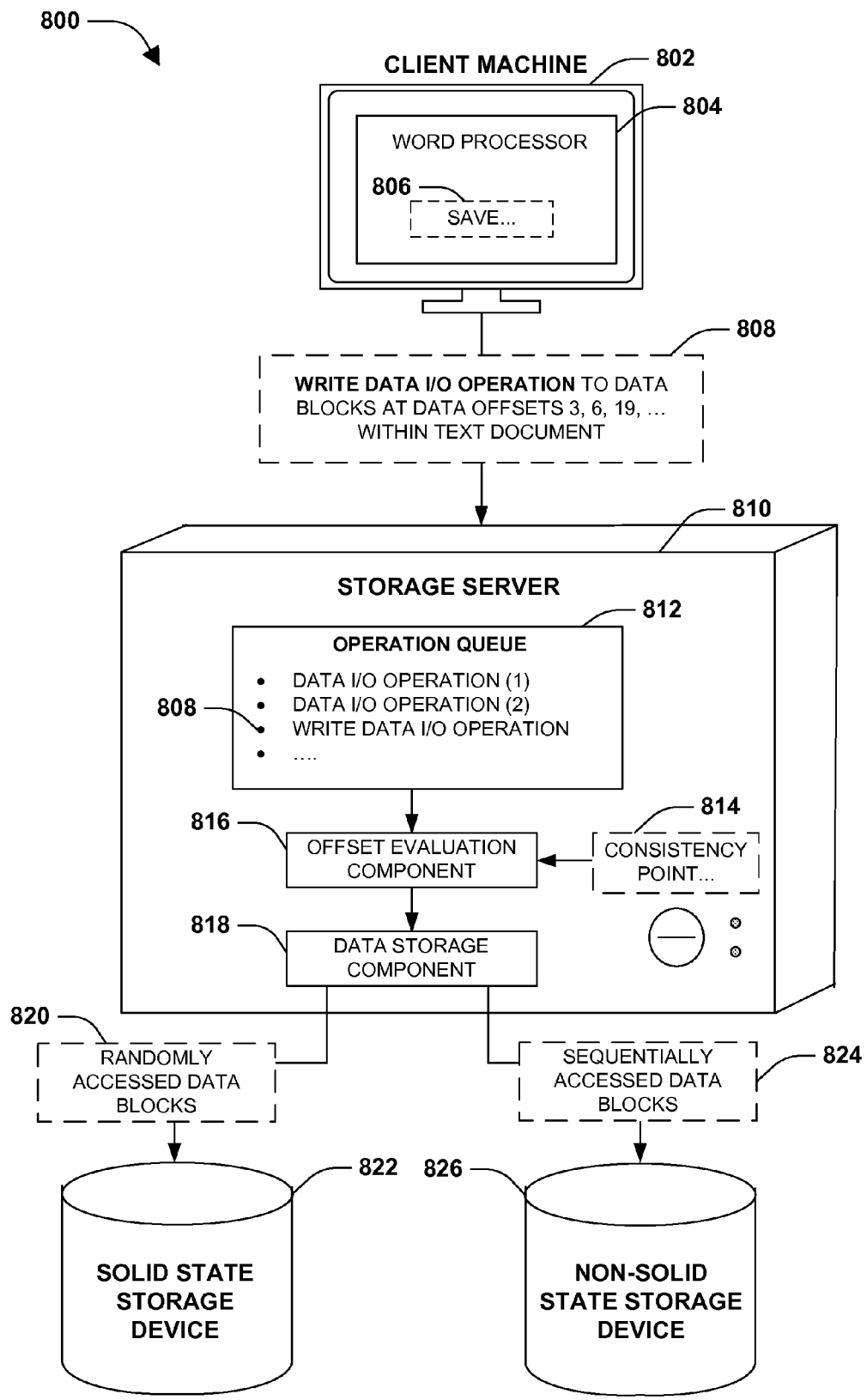
FIG. 8 is an illustration of an example of a storage server processing data I/O operations associated with a solid state storage device and a non-solid state storage device of a hybrid storage aggregate.

FIG. 8 illustrates an example 800 of a storage server 810 processing data I/O operations associated with a solid state storage device 822 and a non-solid state storage device 826 of a hybrid storage aggregate. The storage server 810 may be configured to store data and/or provide clients with access to data stored within the hybrid storage aggregate (e.g., a logical group of one or more solid state storage devices and one or more non-solid state storage devices). Because the storage server 810 may service a large number of clients, the storage server 810 may queue data I/O operations (e.g., write data I/O operations) from clients within an operation queue 812. Upon reaching a consistency point 814 (e.g., the operation queue 812 comprise a more than a threshold number of data I/O operations, a timer elapses, etc.), an offset evaluation component 816 and/or a data storage component 818 within the storage server 810 may dequeue and process data I/O operations (e.g., store 820 randomly accessed data blocks within the solid state storage device 822 and/or store 824 sequentially accessed data blocks within the non-solid state storage device 826).

In one example, a client machine 802 may host a word processor application 804. The word processor application 804 may be interacting with a text document stored within the hybrid storage aggregate. A user of the word processor application 804 may issue a save command 806. The word processor application 804 may send a write data I/O operation 808 to the storage server 810. The storage server 810 may queue the write data I/O operation 808 within the operation queue 812.

Upon reaching the consistency point 814, the offset evaluation component 816 may dequeue the write data I/O operation 808. The offset evaluation component 816 may determine whether the write data I/O operation 808 randomly or sequentially accesses data within the hybrid storage aggregate. For example, the offset evaluation component 816 may determine that the write data I/O operation 808 randomly accessed data based upon evaluation an access pattern (3, 6, 19, . . .) derived from block offsets (3, 6, 19, . . .) specified by the write data I/O operation 808. In this way, the data storage component 818 may store the data blocks of the write data I/O operation 808 within the solid state storage device 822 based upon the random access pattern.

Figure 9:
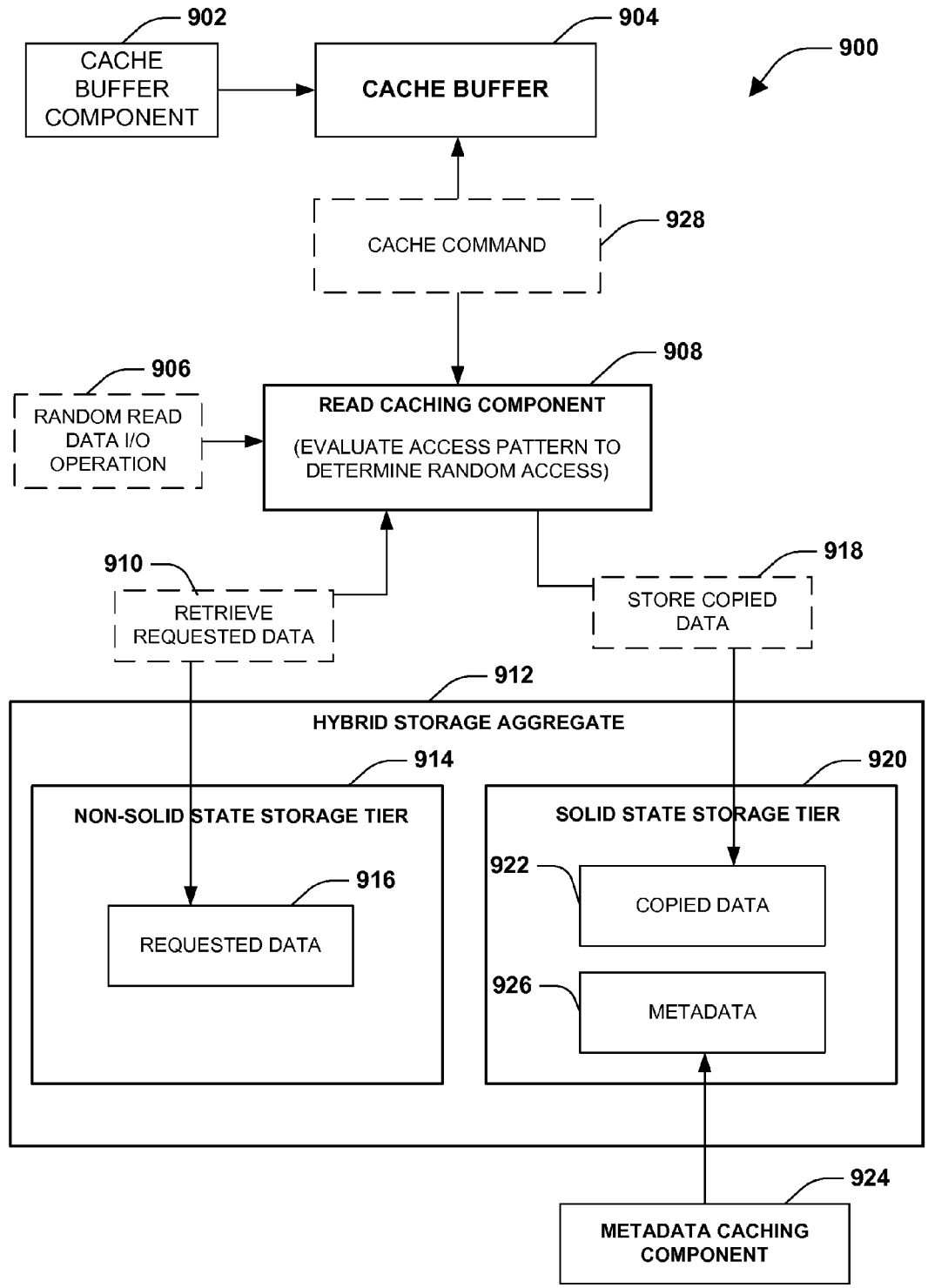
FIG. 9 is a component block diagram illustrating an exemplary system for storing data within a hybrid storage aggregate comprising a non-solid state storage tier and a solid state storage tier.

FIG. 9 illustrates an example of a system 900 configured for storing data within a hybrid storage aggregate 912 comprising a non-solid state storage tier 914 and a solid state storage tier 920. The system 900 may comprise a cache buffer component 902, a read caching component 908, and/or a metadata caching component 924. The cache buffer component 902 may be configured to cache data associated with data I/O operations within one or more tiers of a cache buffer 904 (e.g., based upon a cache command 928 from the read caching component 908). The cache buffer component 902 may migrate cached data between the one or more tiers of the cache buffer 904 based upon frequency of access metrics associated with respective cached data (e.g., lower tiers may be used for recently cached data and/or cached data that may be speculatively read, while upper tiers may be used for frequently accessed cached data). For example, the cache buffer component 902 may migrate cached data to higher tiers based upon cached data being frequently accessed, and may migrate cached data to lower tiers based upon cached data being infrequently accessed (e.g., through an aging process). In this way, the cache buffer 904 may comprise cached data associated with data I/O operations of the hybrid storage aggregate 912.

The read caching component 908 may be configured to identify a random read data I/O operation 906 for requested data 916 stored within the non-solid state storage tier 914 of the hybrid storage aggregate 912 as randomly accessing the requested data 916. It may be appreciated that the read caching component 908 may implement the techniques that have been described herein regarding identifying randomly accessed data (e.g., comparing block offsets of data blocks associated with a data I/O operation to identify an access pattern that may be evaluated to determine whether the data I/O operation randomly or sequentially accessed the data blocks). The read caching component 908 may retrieve 910 the requested data 916 from the non-solid state storage tier 914. In one example, the read caching component 908 may cache (e.g., cache command 928) the requested data 916 within the cache buffer 904, and may satisfy the random read data I/O operation 906 from the cache buffer 904. In another example, the read caching component 908 may store 918 a copy of the requested data 916 as copied data 922 within the solid state storage tier 920. The copied data 922 may be stored within the solid state storage tier 920 to mitigate latency arising from mechanical delay that may result from randomly accessing the requested data 916 from the non-solid state storage tier 914 when processing other (future) data I/O operations.

The metadata caching component 924 may be configured to store file system metadata (e.g., configuration data associated with a file system implemented within the hybrid storage aggregate), hybrid storage aggregate metadata (e.g., configuration data utilized by the hybrid storage aggregate), directory data, and/or other information as metadata 926 within the solid state storage tier 920.

Figure 10:
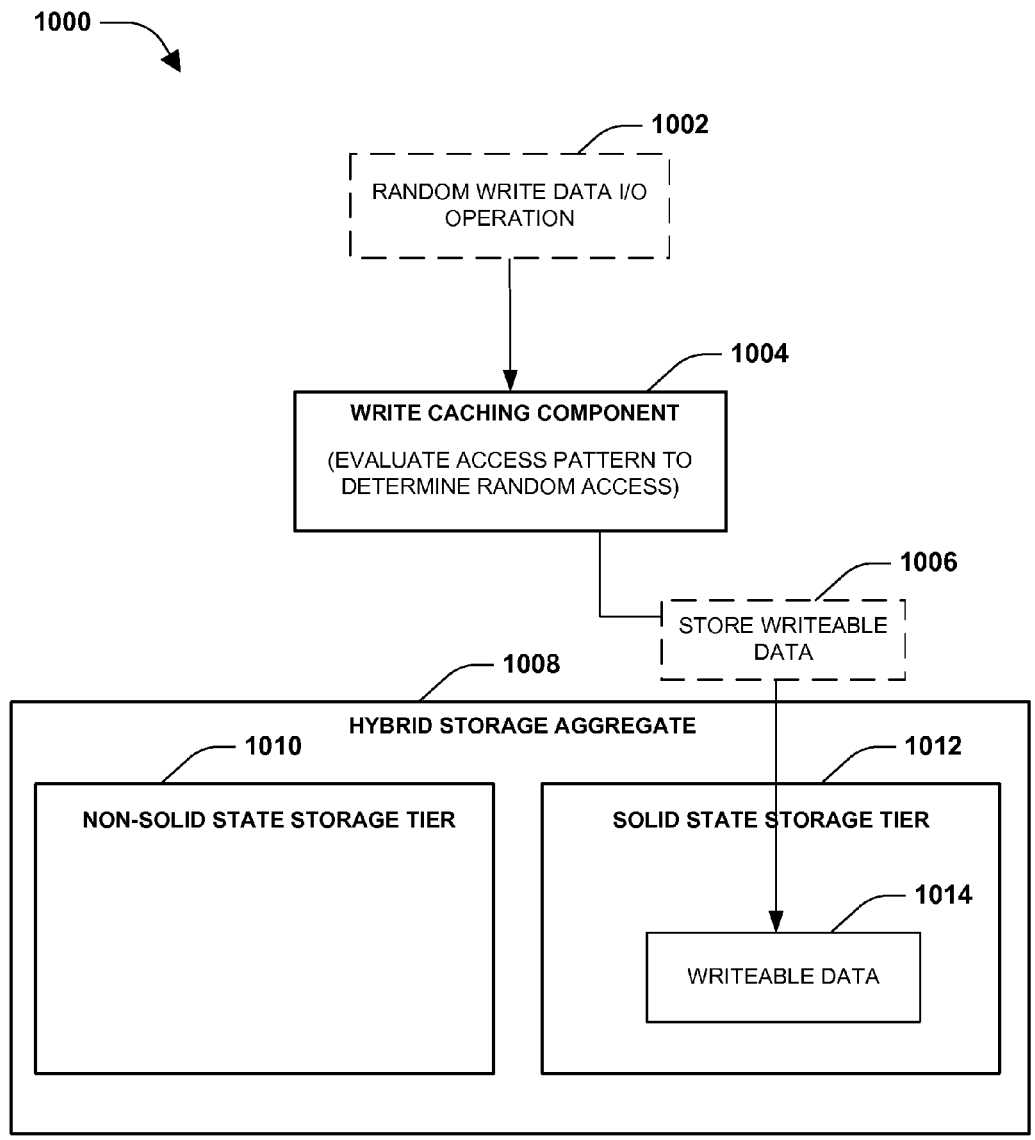
FIG. 10 is a component block diagram illustrating an exemplary system for storing data within a hybrid storage aggregate comprising a non-solid state storage tier and a solid state storage tier.

FIG. 10 illustrates an example of a system 1000 configured for storing data within a hybrid storage aggregate 1008 comprising a non-solid state storage tier 1010 and a solid state storage tier 1012. The system may comprise a write caching component 1004. The write caching component 1004 may be configured to identify a random write data I/O operation 1002 as randomly accessing data. It may be appreciated that the write caching component 1004 may implement the techniques that have been described herein regarding identifying randomly accessed data (e.g., comparing block offsets of data blocks associated with a data I/O operation to identify an access pattern that may be evaluated to determine whether the data I/O operation randomly or sequentially accessed the data blocks). In one example, the write caching component 1004 may identify the random write data I/O operation 1002 as randomly accessing data based upon an indirect buffer comprising locations of leaf buffers of a buffer tree associated with the writeable data. That is, data, such as a file, may be arranged as a buffer tree. Leaf buffers (e.g., leaves of the buffer tree) may comprise the data of the file. Indirect buffers may store locations of the leaf buffers. In this way, the locations within the leaf buffers may be evaluated to determine whether the locations indicate that the data is accessed using a sequential pattern or a random pattern.

Upon identifying the random write data I/O operation 1002 as randomly accessing data (e.g., writing data blocks at non-sequential block offsets), the write caching component 1004 may store 1006 writeable data 1014 within the solid state storage tier 1012 of the hybrid storage aggregate 1008. The writeable data 1014 may be stored within the solid state storage tier 1012 to mitigate latency arising from mechanical delay that may result from accessing such data from the non-solid state storage tier 1010 when processing other data I/O operations.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Figure 11:
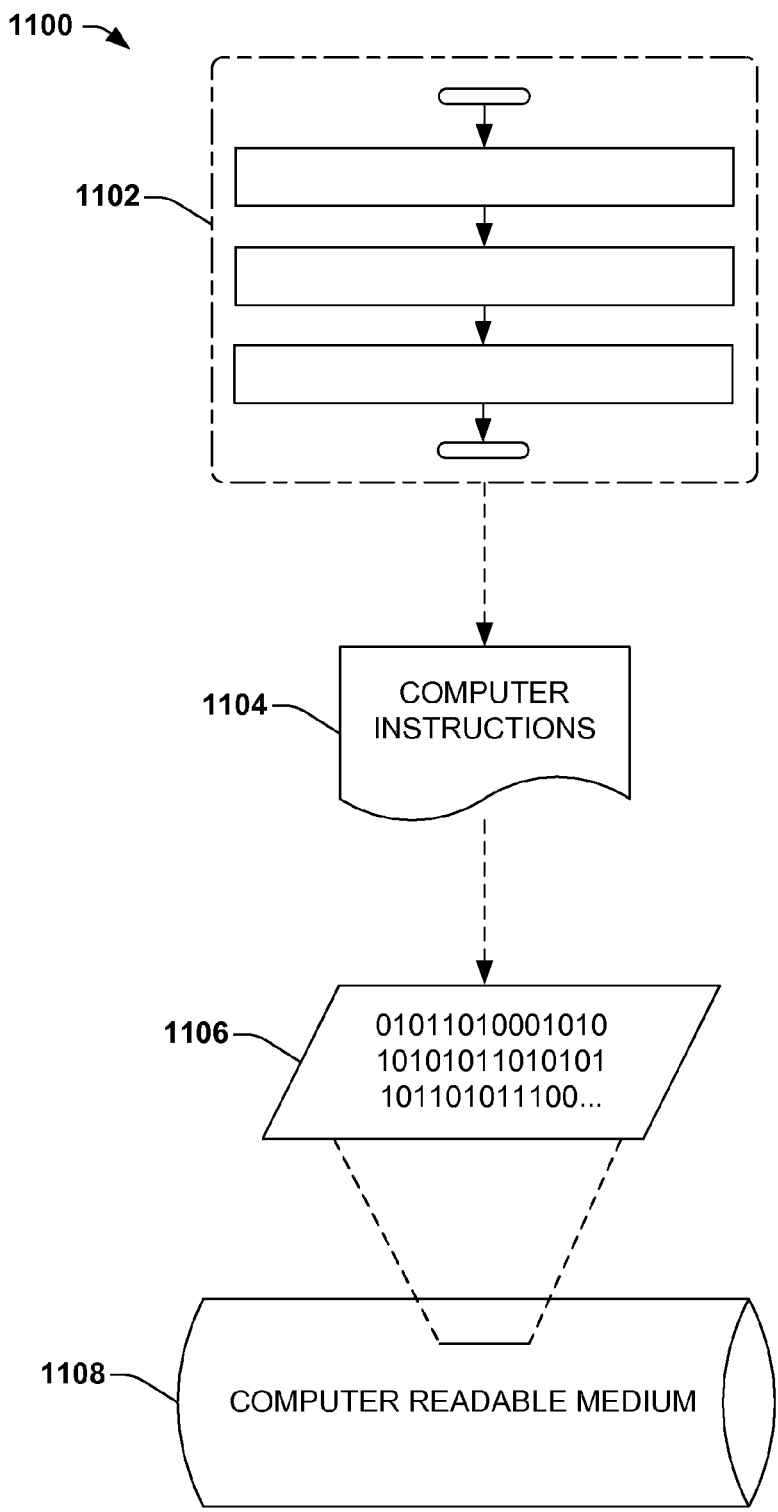
FIG. 11 is an example of a computer readable medium in accordance with one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 11, where the implementation 1100 comprises a computer-readable medium 1108 (e.g., a CD-R, DVD-R, platter of a hard disk drive, flash drive, etc.), on which is encoded computer-readable data 1106. This computer-readable data 1106 in turn comprises a set of computer instructions 1104 configured to operate according to the principles set forth herein. In one such embodiment, the processor-executable instructions 1104 may be configured to perform a method 1102, such as at least some of the method 300 of FIG. 3 and/or method 400 of FIG. 4, for example, and/or at least some of a system, such as at least some of the system 600 of FIG. 6, at least some of system 700 of FIG. 7, and/or at least some of system 900 of FIG. 9, for example. Many such computer-readable media may be devised by those of ordinary skill in the art that are configured to operate in accordance with the techniques presented herein.

Although the disclosure has been shown and described with respect to one or more implementations, equivalent alterations and modifications will occur to others skilled in the art based upon a reading and understanding of this specification and the annexed drawings. The disclosure is intended to include such modifications and alterations. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. Furthermore, to the extent that the terms "includes", "having", "has", "with", or variants thereof are used in either the detailed description or the claims, such terms are intended to be inclusive in a manner similar to the term "comprising." Also, "exemplary" means an example, not the best; "or" is intended to be inclusive not exclusive; "a" and/or "an" mean "one or more" unless specified otherwise and/or clear from context to be directed to a singular form; and at least one of A and B and/or the like generally means A or B or both A and B.

What is claimed is:

1. A method for identifying randomly accessed data to store in a solid state storage device of a hybrid storage aggregate, comprising:
   identifying block offsets of data blocks associated with a data I/O operation to determine an access pattern; and
   responsive to the access pattern indicating that the data I/O operation randomly accesses the data blocks, storing the data blocks onto a solid state storage device, at least some of at least one of the identifying or the storing implemented at least in part via a processor.

2. The method of claim 1, the storing comprising:
   storing the data blocks within a cache on the solid state storage device.

3. The method of claim 1, comprising:
   responsive to the access pattern indicating that the data I/O operation sequentially accesses the data blocks, storing the data blocks onto a non-solid state storage device.

4. The method of claim 1, comprising:
   determining a time span since a data block stored on the solid state storage device was last accessed; and
   if the time span is greater than a threshold time, then migrating the data block from the solid state storage device to a non-solid state storage device.

5. The method of claim 1, the access pattern comprising a sequence of block offsets associated with data blocks that are to be accessed by the data I/O operation during an execution of the data I/O operation.

6. The method of claim 5, comprising:
   evaluating the sequence of block offsets to compare values of respective block offsets with values of neighboring block offsets within the sequence of block offsets.

7. The method of claim 5, comprising:
   determining whether a value of a block offset of the sequence of block offsets differs from a value of a neighboring block offset greater than a threshold value.

8. The method of claim 1, the storing the data blocks comprising:
   upon identifying the data I/O operation as a write data I/O operation:

storing the data blocks onto a non-solid state storage device; and marking the data blocks with a read-after-write caching indicator, the read-after-write caching indicator specifying that the data blocks are to be cached onto the solid state storage device upon being read from the non-solid state storage device.

9. The method of claim 1, the storing the data blocks comprising at least one of:
upon identifying the data I/O operation as a random read data I/O operation:
retrieving the data blocks from a non-solid state storage device;
storing the data blocks within a cache buffer; and
caching the data blocks from the cache buffer onto the solid state storage device; or
upon identifying the data I/O operation as a random write data I/O operation:
caching the data blocks onto the solid state storage device.

10. A system for identifying randomly accessed data to store in a solid state storage device of a hybrid storage aggregate, comprising:
an offset evaluation component configured to:
identify block offsets of data blocks associated with a data I/O operation to determine an access pattern; and
a data storage component configured to:
responsive to the access pattern indicting that the data I/O operation randomly accesses the data blocks, store the data blocks onto a solid state storage device, at least some of at least one of the offset evaluation component or the data storage component implemented at least in part via a processor.

11. The system of claim 10, the data storage component configured to:
store the data blocks within a cache comprised on the solid state storage device.

12. The system of claim 10, the data storage component configured to:
responsive to the access pattern indicating that the data I/O operation sequentially accesses the data blocks, store the data blocks onto a non-solid state storage device.

13. The system of claim 10, the data storage component configured to:
determine a time span since a data block stored on the solid state storage device was last accessed; and
if the time span is greater than a threshold time, then migrate the data block from the solid state storage device to a non-solid state storage device.

14. The system of claim 10, the access pattern comprising a sequence of block offsets associated with data blocks that are to be accessed by the data I/O operation during an execution of the data I/O operation.

15. The system of claim 14, the offset evaluation component configured to:
evaluate the sequence of block offsets to compare values of respective block offsets with values of neighboring block offsets within the sequence of block offsets.

16. The system of claim 14, the offset evaluation component configured to:
determine whether a value of a block offset of the sequence of block offsets differs from a value of a neighboring block offset greater than a threshold value.

17. The system of claim 10, the data storage component configured to:
pre-fetch additional data associated with the data blocks; and
store the additional data onto the solid state storage device.

18. The system of claim 12, the solid state storage device and the non-solid state storage device comprised within an aggregate of logically grouped storage devices.

19. The method of claim 12, the data I/O operation stored within an operation queue with one or more other data I/O operations, and the data storage component configured to contemporaneously store the data blocks associated with the data I/O operation and data blocks associated with the one or more other data I/O operations onto at least one of the solid state storage device or the non-solid state storage device.

20. A non-transitory computer readable medium comprising computer executable instructions that when executed by a processor implement a method for identifying randomly accessed data to store in a solid state storage device of a hybrid storage aggregate, comprising:
upon detecting an occurrence of a consistency point:
identifying access patterns for respective data I/O operations queued for processing, an access pattern comprising one or more block offsets with which a data I/O operation is to access;
aggregating the access patterns to create an aggregated access pattern;
responsive to the aggregated access pattern comprising a sequential access pattern, storing data blocks associated with the sequential access pattern onto a non-solid state storage device; and
responsive to the aggregated access pattern comprising a random access pattern, storing data blocks associated with the random access pattern onto a solid state storage device.

21. A system for storing data within a hybrid storage aggregate comprising a solid state storage tier and a non-solid state storage tier, comprising:
a write caching component configured to:
identify a random write data I/O operation associated with a hybrid storage aggregate comprising a solid state storage tier and a non-solid state storage tier, the random write data I/O operation comprising writeable data; and
store the writeable data onto the solid state storage tier; and
a read caching component configured to:
identify a random read data I/O operation for requested data stored on the non-solid state storage tier of the hybrid storage aggregate;
retrieve the requested data from the non-solid state storage tier; and
store a copy of the requested data as copied data onto the solid state storage tier, at least some of at least one of the write caching component or the read caching component implemented at least in part via a processor.

22. The system of claim 21, comprising:
a metadata caching component configured to:
store at least one of file system metadata, hybrid storage aggregate metadata, or directory data onto the solid state storage tier.

23. The system of claim 21, the read caching component configured to:
cache the requested data retrieved from the non-solid state storage tier within a cache buffer;
satisfy the random read data I/O operation from the cache buffer; and
store the copy of the requested data onto the solid state storage tier as the copied data using the requested data stored within the cache buffer.

24. The system of claim 21, comprising:
a cache buffer component configured to:
- cache data associated with data I/O operations within one or more tiers of a cache buffer; and
- notify at least one of the read caching component or the write caching component to migrate data within the cache buffer to at least one of the solid state storage tier or the non-solid state storage tier.

25. The system of claim 21, the write caching component configured to:
- identify the random write data I/O operation based upon an indirect buffer comprising locations of leaf buffers of a buffer tree associated with the writeable data, the locations indicating the random write data I/O operation randomly accesses data blocks associated with the writeable data.

26. The system of claim 21, the solid state storage tier configured as a cache.

27. The system of claim 24, the cache buffer component configured to:
- migrate cached data between the one or more tiers of the cache buffer based upon frequency of access metrics associated with respective cached data.

* * * * *